May 9, 1939.   D. A. YOUNG ET AL   2,157,947
REPULSION VANE INSTRUMENT
Original Filed April 16, 1936
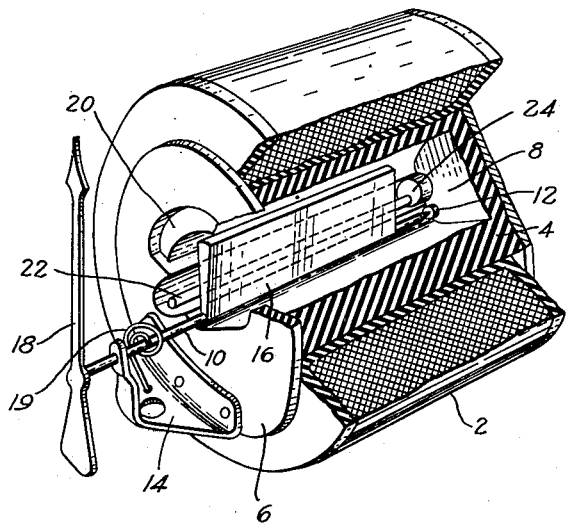
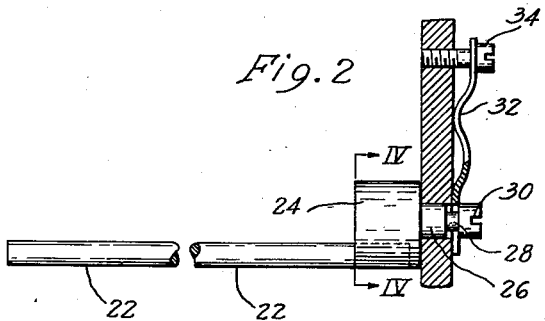
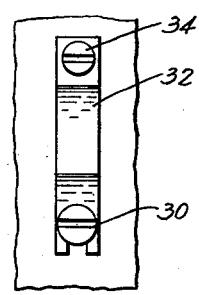
WITNESSES:
Michael Stark
INVENTORS.
Douglass A. Young and
Henry L. Bernarde.
BY
ATTORNEY Patented May 9, 1939

2,157,947

UNITED STATES PATENT OFFICE 2,157,947

REPULSION VANE INSTRUMENT

Douglass A. Young, East Orange, and Henry L. Bernarde, Kearny, N. J., assignors to Westinghouse Electric & Manufacturing Company, East Pittsburgh, Pa., a corporation of Pennsylvania Application April 16, 1936, Serial No. 74,714
Renewed November 1, 1938

8 Claims. (Cl. 171—95)

The present invention relates to electrical measuring instruments, and more particularly to an improved means for adjusting and calibrating indicating instruments of the so-called repulsion vane type.

In instruments of this type, a pivoted vane and a stationary vane are usually mounted in parallel relation within a solenoid which is to be energized in accordance with the quantity to be measured. The magnetic field of the solenoid acts upon the two vanes to cause a repulsion of the pivoted vane, with respect to the stationary vane. The pivoted vane is normally biased toward the stationary vane and controls an indicating pointer cooperating with a scale to indicate the magnitude of the energization of the solenoid.

In calibrating instruments of this character, considerable difficulty has been experienced in obtaining an adjustment which is sufficiently large and at the same time, not so large that scale distortion will result; that is, to be able to properly calibrate the instrument but at the same time, to have a standard printed scale for all instruments of the same range.

In the prior art, it has been necessary to either alter the resistance of the solenoid winding or, in some cases, to move the winding axially of the vanes to obtain the desired deflection of the pivoted vane for a given energization of the winding.

It is an object of the present invention to avoid the difficulty and expense inherent in prior art expedients for calibrating an instrument of the repulsing vane type, and at the same time to obtain a range of calibration which is larger than that heretofore obtained, without distorting the instrument scale to an appreciable extent.

Other objects of the invention will be apparent from the following description and accompanying drawing, wherein:

Figure 1 is a view in perspective, with parts broken away, embodying the present invention;

Fig. 2 is a view in section, with parts broken away, of the calibrating device constituting the present invention;

Fig. 3 is a view in end elevation of a portion of the structure shown in Fig. 2; and Fig. 4 is a view in section on the line IV—IV of Fig. 2.

Referring more specifically to the drawing, the movement of the indicating instrument embodying the invention comprises a coil or winding 2 to be energized from the circuit to be measured.

Within the solenoid 2 is disposed a body 4 of insulating material having an enlarged flange 6 overlying one end of the solenoid 2 and provided with a chamber 8.

Within the chamber 8 is disposed a shaft 10 pivotally mounted at one end thereof in a bearing 12 secured to the rear wall of the chamber and pivotally supported at the opposite end in a bracket 14 secured to the flange 6. A vane 16 of magnetic material is secured to the shaft along one of its edges in any suitable manner for rotation with the shaft 10 and the free end of the shaft carries an indicating pointer 18 for cooperation with a scale in a usual manner. The pointer is biased to a zero position by a spiral spring 19.

The chamber 8 is so shaped that the free edge of the vane 16 is relatively close to the chamber wall so that an air damping effect is obtained, when the front of the chamber is closed by a suitable plate, not shown, disposed in the recess 20.

The stationary vane comprises a rod 22 of magnetic material disposed parallel to the shaft 10 in an elongated recess in the wall of the chamber 8. In instruments of this class in the prior art, the rod 22 was rigidly secured in its desired position. According to the present invention, however, the rod 22 is secured at one end thereof to a hub 24 having a reduced portion 26 extending through the rear wall of the chamber 8.

Referring to Figs. 2 and 4, it will be noted that the rod 22 is mounted eccentrically with respect to the hub 24, which is an important feature of the invention. Although the hub 24 and the means of securing it to the rod 22 may be of any desired construction, it has been found advantageous to make the hub 24 of extruded material, such as aluminum or an alloy thereof. The material is extruded to substantially the shape shown in Fig. 4. The extruded piece may then be turned down to the size of the portion 26, a groove 28 cut therein, and a slot provided in the free end 30 to facilitate rotation of the hub. The rod 22 is then staked into the longitudinal notch in the hub 24 to be removably retained in that position.

Referring to Figs. 2 and 3, the hub 24 is resiliently retained in any position to which it may be rotated by a spring member 32 secured at one end to the rear face of the body 4 by means of a screw 34, and the free end of the spring 32 is slotted to embrace the reduced portion 28 on the hub 24, as indicated. In practice, it has been found that the spring 32 acting upon the hub 24, efficiently maintains the hub in a desired position, and at the same time, permits easy rotation of the hub by means of a small screw driver engaging the screw head 30.

In calibrating an instrument of the construction above described, the winding or solenoid 2 is energized at a predetermined value of current or voltage, and ordinarily, calibration will be required to bring the pointer 18 into registration with the proper scale division. This is accomplished in the present invention by merely rotating the hub 24 which swings the bar or vane 22 in a cylindrical plane parallel to the axis of the pointer shaft 10. It has been found that efficient calibration of as much as plus or minus 10% of the scale length can be obtained without appreciably distorting the scale distribution; that is, an instrument properly calibrated to a point of half its scale length may show an improper calibration at greater or smaller energization of the winding 2, necessitating, ordinarily, a different scale for different instruments. In the prior art, this distortion was such that a calibration of plus or minus 2% was all that could be obtained without using a different scale, and the method of calibrating was so long and tedious as to be very expensive from a manufacturing point of view. In applicants' construction, it will be noted that as the hub 24 is turned, the vane 22 has a cyclic path bringing it closer to the shaft 10, and at the same time, varies its position with respect to the lateral dimension of the vane 16. This compound movement, it is believed, results in applicants' remarkable calibration range and compensates for scale length distortion usually obtained with a calibrating range of this magnitude.

Quite obviously modifications may be made in the structure specifically shown and described without departing from the scope of the invention as set forth in the appended claims.

We claim as our invention:

1. In an electrical instrument of the repulsion-vane type including a chambered member having an end wall and a winding surrounding said member for energization in accordance with a quantity to be measured, a moving vane in said chamber mounted for pivotal movement about one of its edges, a stationary vane comprising a rod and means for mounting it parallel to said moving vane comprising a hub having a reduced portion on one end thereof, an aperture in said end wall through which said reduced hub portion is proportioned to extend, a resilient clip and means for mounting it to retain said hub in operative position and frictionally restrain it against rotation, and means for securing one end of said rod to said hub eccentric to the axis of rotation of said hub.

2. In an electrical indicating instrument including a housing having an end wall, a movable vane of magnetically conducting material and means for mounting it in said housing for pivotal movement on an axis at right angles to said wall, a stationary rod of magnetically conducting material for disposition parallel to the axis of pivotal movement of said vane to repel the latter when the vane and rod are subjected to a magnetic field, means for adjustably supporting said rod in such position comprising a substantially cylindrical member having a reduced portion extending from one end thereof for extension through said end wall from within said housing, a circumferential groove in said reduced portion beyond said wall, a spring clip secured at one end to the outside of said wall and having its other end disposed in said groove, said clip being proportioned and formed to frictionally restrain said cylindrical member against rotation, and means for securing one end of said rod to said member within said housing with the longitudinal axis of the rod parallel to the axis of rotation of the member.

3. In an electrical instrument of the repulsion vane type including a chamber in which a pivoted vane is mounted, a stationary vane and means for adjustably mounting it to repel said pivoted vane when the chamber is disposed in a magnetic field, comprising a supporting member secured to one end of said stationary vane and having a portion extending through an end wall of said chamber for rotatably mounting said member for rotation about an axis eccentric with respect to said stationary vane, and a resilient member secured to said end wall and engaging said means to retain it in operative position and frictionally restrain the rotation of the supporting member.

4. In an electrical instrument of the repulsion vane type, means defining an elongated chamber having an end wall, a strip of magnetic material and means for pivotally mounting it for rotation about a longitudinal edge thereof parallel to the longitudinal dimension of said chamber, said chamber being arcuate in cross-section with a radius slightly larger than the width of said strip, and having flat walls at the limits of pivotal movement of the vane, a recess in one of said flat walls extending longitudinally of the chamber, a rod of magnetic material in said recess, and means for laterally adjusting the rod in said recess with respect to the axis of rotation of said strip.

5. In an electrical instrument of the repulsion vane type, means defining an elongated chamber having an end wall, a strip of magnetic material and means for pivotally mounting it for rotation about a longitudinal edge thereof parallel to the longitudinal dimension of said chamber, said chamber being arcuate in cross-section with a radius slightly larger than the width of said strip, and having flat walls at the limits of pivotal movement of the vane, a recess in one of said flat walls extending longitudinally of the chamber, a rod of magnetic material in said recess, and means for laterally adjusting the rod in said recess with respect to the axis of rotation of said strip, including means constituting an enlargement on one end of said rod and having an eccentric portion extending through said end wall for rotation with respect thereto, the axis of said extending portion being parallel to the axis of said rod.

6. In an electrical instrument of the moving iron type, a magnetic vane rotatable about an axis, and a magnetic member having a dimension radial from said axis which is substantially smaller than the dimension of said vane radial from said axis, said magnetic member being adjustable for varying its distance from said axis.

7. In an electrical instrument of the moving iron type, a magnetic vane rotatable about an axis, and a magnetic member having a dimension radial from said axis which is substantially smaller than the dimension of said vane radial from said axis, said magnetic member being rotatable for adjustment eccentrically about a second axis spaced from said first-named axis.

8. In an electrical instrument of the moving iron type, a magnetic vane mounted for rotation about a first axis, and a magnetic member provided with a cylindrical surface having an axis substantially parallel to said first axis, the diameter of said cylindrical surface being substantially smaller than the dimension of said vane radial from said first axis, said magnetic member being adjustable for varying its distance from said first axis.

DOUGLASS A. YOUNG.
HENRY L. BERNARDE.